T. R. SINCLAIRE.
Apparatus for Filtering Liquids.
No. 163,814. Patented May 25, 1875.
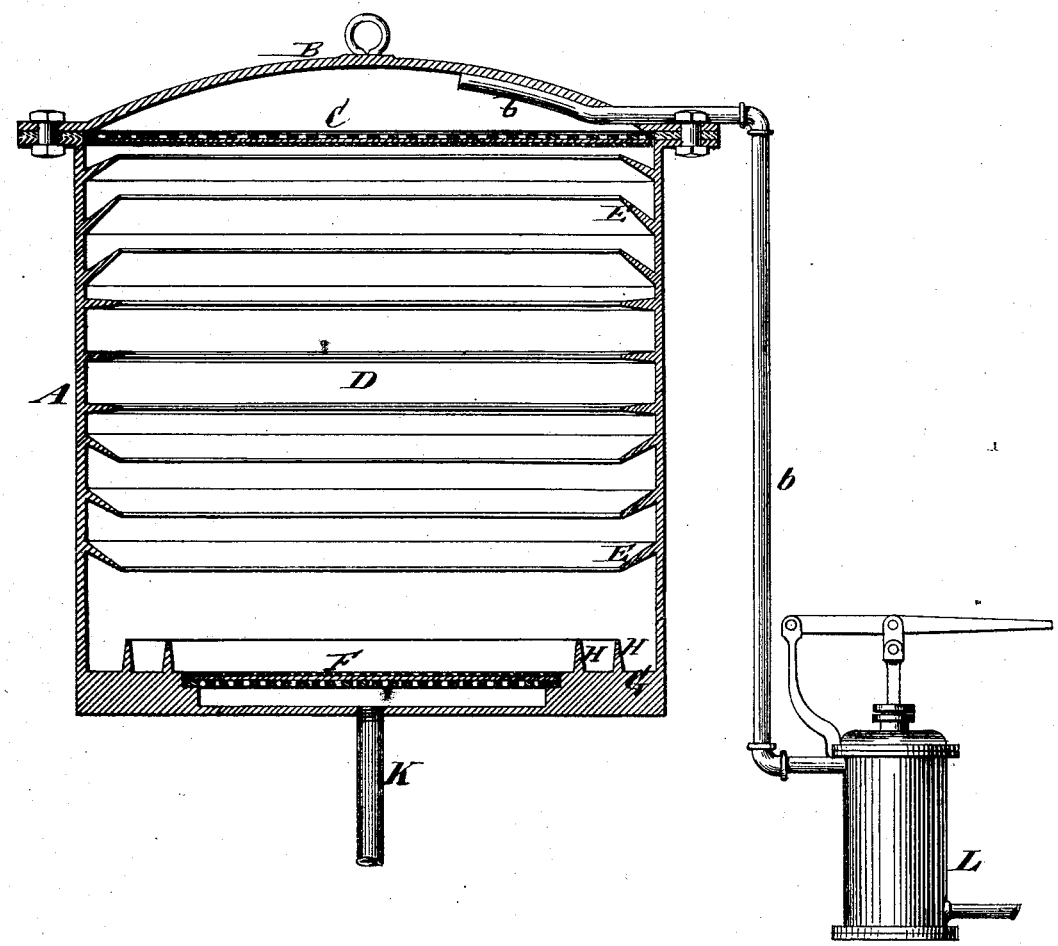

UNITED STATES PATENT OFFICE.

THOMAS R. SINCLAIRE, OF NEW YORK, N. Y.

IMPROVEMENT IN APPARATUS FOR FILTERING LIQUIDS.

Specification forming part of Letters Patent No. 163,814, dated May 25, 1875; application filed July 29, 1874.

*To all whom it may concern:*

Be it known that I, THOMAS R. SINCLAIRE, of the city of New York, in the county and State of New York, have invented certain Improvements in Apparatus for Filtering Liquids, of which the following is a specification:

My present invention consists in certain improvements in the internal construction of a filtering-vessel, whereby the liquid being filtered is prevented from forming channels or grooves between the filtering material and the sides and bottom of the filtering-vessel, it being compelled to pass properly through the body of the filtering material before finding its escape from the apparatus, as will be hereinafter more fully explained.

The accompanying drawing is a vertical central section of a filtering apparatus embodying my present improvements.

A designates a filtering-vessel, which may be of any suitable construction, and the space within this vessel employed as a filtering-chamber is lettered D. In the example shown in the drawing the said vessel is provided with a cover, B, so applied as to produce an air-tight vessel for filtering liquids under pressure, which may be forced into the vessel through a pipe, *b b*, communicating with a force-pump, L, and I will here remark that any other suitable forcing apparatus may be employed; or the liquid to be filtered may be caused to pass through the apparatus under static or other pressure. The vessel A is provided with an eduction orifice or pipe, K, which, in the present instance, is located in the bottom of the vessel. Above such eduction-orifice I have shown the vessel as provided with a permeable false bottom, diaphragm, or plate, F, which, in the present instance, is composed of a perforated sheet of metal, canvas, and wire-cloth; and I have also shown the vessel as provided with a permeable plate or diaphragm, C, which, in the present instance, is also composed of a perforated sheet of metal, canvas, and wire-cloth. E E designate a number of ledges projecting inwardly from the inside surface of the wall or side or sides of the vessel A. Of these ledges there may be as many as desired. I have shown a series which extend obliquely upward, and a series which extend obliquely downward, and also a series at right angles to the side wall of the vessel. These ledges prevent the liquid, when passing through the vessel, from forming channels or grooves between the filtering material and the sides of the vessel. H H designate ledges projecting from the bottom of the vessel, and forming a barrier at the bottom of the vessel, to prevent the liquid when being filtered from forming similar channels or grooves at the bottom of the vessel in its passage to the outlet orifice or pipe K.

As a further means of preventing the escape of liquid without passing through the body of the filtering material, and especially in a case where the ledges H H are dispensed with, I so arrange or construct the false bottom F as to leave an impervious surface, G, between it and the side walls of the vessel, the weight of the coal or other filtering material, in such case, serving to prevent the forming of channels or grooves along this impervious surface when filtering under pressure; and in some cases it may be desirable to make the plate F convex, or of any other desirable form.

From the foregoing description it will be understood that the liquid entering the upper portion of the vessel will, in its passage down through the filtering material contained in the chamber D, be deflected from the sides of the vessel by the ledges E, and thereby caused to pass through the body of the filtering material itself.

It is obvious that the operation of the ledges and the arrangement of the false bottom hereinabove described will be substantially the same in an open as in an air-tight vessel. It is also obvious that in either an open or an air-tight vessel the bottom of the vessel below the plate F may be dispensed with, a suitable receptacle being employed to receive the filtered liquid. It is also obvious that in filtering under pressure the liquid may be forced through the orifice or pipe K, and may find its escape at the top of the vessel.

I will here remark that I do not limit myself to the particular construction of the ledges E and H, (shown in the drawing,) it being obvious that V-shaped or other suitably-shaped recesses may be cut or formed in the bottom of the vessel, and that the sides of the vessel may be sufficiently thick to allow similar recesses to be cut therein, in which case the bottom of the recesses would constitute the inner surface of the walls of the vessel, and the projecting portions of such wall would be an equivalent for the ledges; or, indeed, the vessel could be constructed of corrugated metal in such manner as to produce the same effect as that produced by the said ledges.

What I claim as my invention, and desire to secure by Letters Patent, is—

1. The combination, with the filtering-vessel A, constructed with the impervious surface G, of the false bottom F and the side or bottom ledges E H, either or both, substantially as herein specified.

2. The combination of the vessel A, ledges E H, false bottom F, diaphragm C, cover B, pipe $b$, orifice or pipe K, and forcing apparatus L, substantially as and for the purposes specified.

THOS. R. SINCLAIRE.

Witnesses:
A. J. DE LACY,
B. W. HOFFMAN.